March 11, 1924.
J. HAJDU
AUTOMOBILE
Filed Feb. 17, 1923
1,486,660
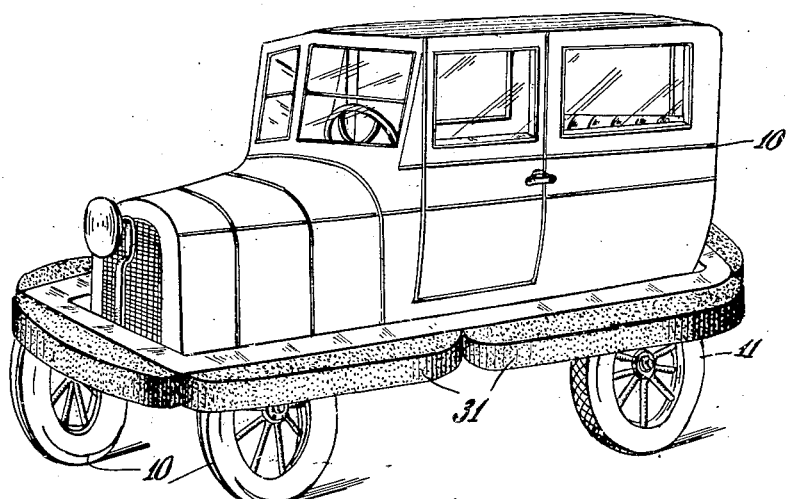
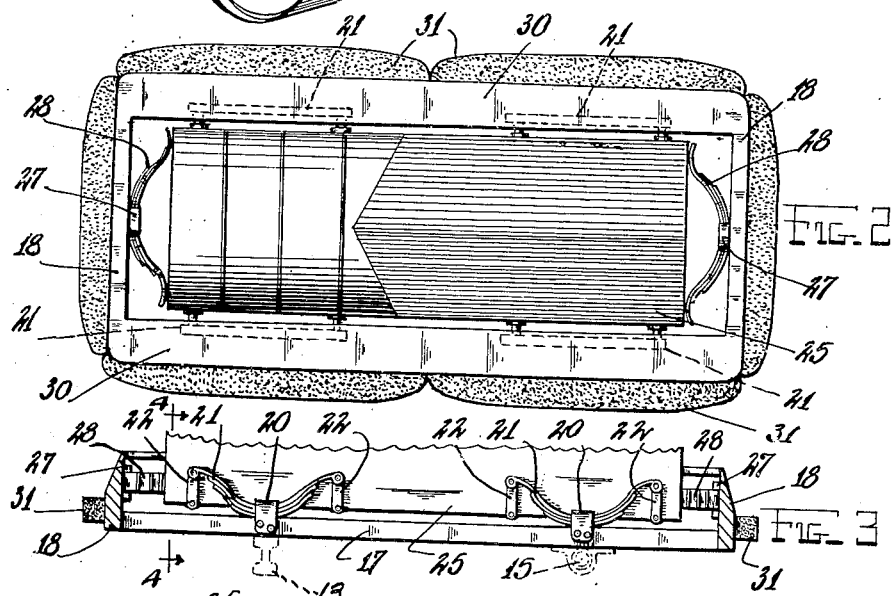
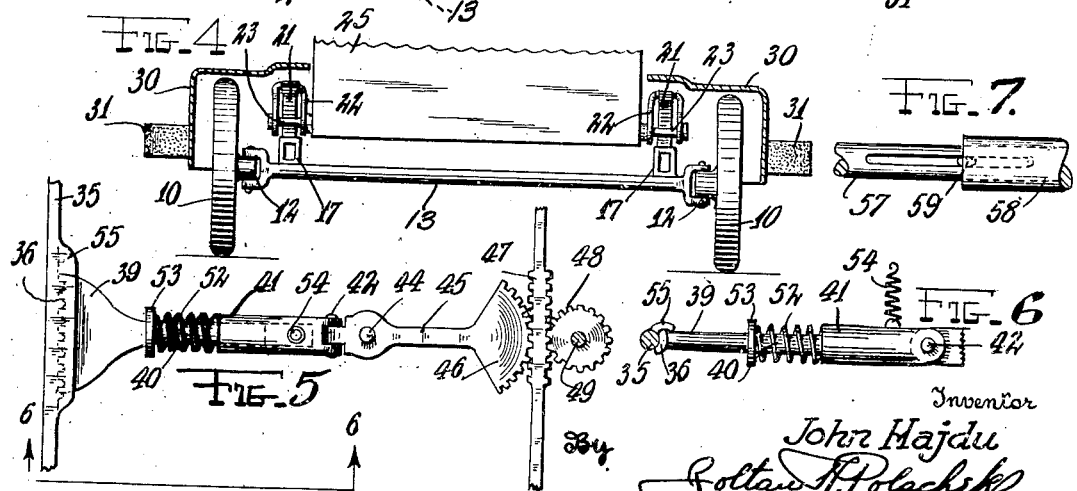
Inventor
John Hajdu
Attorney Patented Mar. 11, 1924.

1,486,660

UNITED STATES PATENT OFFICE.

JOHN HAJDU, OF MERCER, PENNSYLVANIA.

AUTOMOBILE.

Application filed February 17, 1923. Serial No. 619,550.

*To all whom it may concern:*

Be it known that I, JOHN HAJDU, a citizen of Czechoslovakia, residing at Mercer, in the county of Mercer and State of Pennsylvania, have invented certain new and useful Improvements in Automobiles, of which the following is a specification.

This invention relates to automobiles, having more particular reference to the mounting of the body on the running gear.

The invention has for an object to mount the body of the automobile in such a manner to reduce to a minimum shocks or jars resulting either from collisions with other vehicles or with fixed objects, or due to the poor condition of the road on which the automobile may be traveling.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view of an automobile having the invention applied thereto.

Fig. 2 is a plan view.

Fig. 3 is a detail longitudinal view showing the manner of mounting the body on the wheel frame, the body being shown in elevation and the transverse members of the wheel frame being shown in section.

Fig. 4 is a transverse sectional view taken along the line 4—4 of Fig. 3.

Fig. 5 is a detail plan view of the steering gear.

Fig. 6 is a longitudinal section on the line 6—6 of Fig. 5.

Fig. 7 is a fragmentary longitudinal view of the drive shaft.

Referring now to the drawings the front and rear wheels of the automobile are indicated respectively at 10 and 11. The front wheels are mounted by the usual type of knuckle joints such as shown at 12 in Fig. 4, on a fixed front axle 13. The rear wheels are mounted on the usual type of rotating axle which is indicated at 15 in Fig. 3. These axles 13 and 15 support a wheel frame comprising the longitudinal beams 17 and transverse members 18, the beams 17 being here mounted directly on the axles.

Fixed as by the U-straps 20 to the beams 17 are leaf springs 21 of which there is a front pair and a rear pair. These leaf springs have suspended from their ends the shackles 22 with which engage studs 23 fixed in the body 25 of the automobile, thereby supporting the said body on the springs 21. The designation body 25 in the present case includes both the engine and transmission as well as the seats or compartments for the passengers, the body being thus distinguished from the running gear. Secured as by means of the straps 27 to the transverse frame members 18 are leaf springs 28 which bear on the front and rear of the body 25 and act to cushion the latter against shocks due to striking, or being struck by, any object. Guard shields 30 may extend along the sides of the automobile, being suitably attached to the beams 17, while a resilient bumper element 31 extends around the wheel frame.

For steering the automobile I have devised the means shown in Figs. 5 and 6. In these views the usual transverse rod which connects to the arms on the wheel knuckles is shown at 35 and is formed with rack teeth 36 engaged by a gear segment 39 formed on the end of a rod 40 which telescopes into and has a feather connection with a tubular member 41 pivoted as at 42 to swing vertically on an arm 45 which is pivoted at the point 44 to the body 25 to swing horizontally. The rear end of this arm 45 has formed thereon a gear segment 46 meshing with one face of a double faced transverse rack bar 47 suitably guided under the body 25, the opposite face of this rack bar being engaged by a pin-gear 48 on the lower end of the usual steering shaft 49. The gear segment 39 is pressed against the rack 36 by means of an expansion spring 52 coiled around the rod 40 and bearing between the end of the member 41 and a flange 53 on the rod. To hold the segment 39 against swinging vertically out of engagement with the rack 36 I attach to the member 41 one end of a tension spring 54 whose opposite end is attached to the body 25 and form on the steering rod 35 a longitudinal flange 55 which limits the upward movement of the segment.

To provide for proper connection between the motor and the rear axle 15 I form the drive shaft in two sections 57 and 58 the former telescoping into the latter and having a feather connection therewith as at 59.

While I have illustrated and described a will be understood that I do not limit myself to the precise construction herein disclosed and the right is reserved to all modifications and changes coming within the scope of the invention as defined in the appended claims.

Having thus described my invention what I claim as new and desire to protect by Letters Patent of the United States is as follows:

1. In an automobile, wheels, a wheel frame resting thereon, a body longitudinally movable on said frame, steering means applied to certain of said wheels comprising a pair of transverse rods spaced longitudinally one behind the other, the front rod being supported by the wheel frame and the rear rod by the said body, and an operative connection between said rods whereby they are caused to move oppositely in unison, comprising a rock arm pivoted between its ends and engaged at opposite ends with the respective rods, said rock arm being of telescopic construction to permit of relative displacement, longitudinally of the automobile, of the said rods without disengagement of the rock arm therefrom, said rock arm also including two parts hinged together on a horizontal axis to accommodate relative vertical displacement of the said rods.

2. In an automobile, wheels, a wheel frame resting thereon, a body longitudinally movable on said frame, steering means applied to certain of said wheels comprising a transverse rod formed with rack teeth, an extensible arm formed with a gear segment meshing with said rack teeth, said arm forming a vertically swingable section of a lever fulcrumed between its ends to the said body to swing horizontally, a steering shaft carried by said body, and operative connections between said shaft and lever.

3. In an automobile, wheels, a wheel frame resting thereon, a body longitudinally movable on said frame, steering means applied to certain of said wheels comprising a transverse rod formed with rack teeth, an extensible arm formed with a gear segment meshing with said rack teeth, said arm forming a vertically swingable section of a lever fulcrumed between its ends to the said body to swing horizontally, a steering shaft carried by said body, and operative connections between said shaft and lever, a flange on said rod overhanging said rack teeth and a spring engaged with said arm and urging said gear segment against said flange.

In testimony whereof I have affixed my signature.

JOHN HAJDU.